(12) United States Patent
Yang et al.

(10) Patent No.: US 12,212,022 B2
(45) Date of Patent: Jan. 28, 2025

(54) MULTI-TAB CYLINDRICAL BATTERY ROLL CORE AND LITHIUM ION BATTERY

(71) Applicant: LINKDATA NEW ENERGY CO., LTD., Wuxi (CN)

(72) Inventors: Sitao Yang, Wuxi (CN); Xiaoyun Zhang, Wuxi (CN)

(73) Assignee: LINKDATA NEW ENERGY CO., LTD., Wuxi (CN)

( * ) Notice: Subject to any disclaimer, the term of this patent is extended or adjusted under 35 U.S.C. 154(b) by 534 days.

(21) Appl. No.: 17/545,834

(22) Filed: Dec. 8, 2021

(65) Prior Publication Data

US 2022/0102817 A1    Mar. 31, 2022

Related U.S. Application Data

(63) Continuation-in-part of application No. PCT/CN2020/130545, filed on Nov. 20, 2020.

(30) Foreign Application Priority Data

May 18, 2020 (CN) .......................... 202020825061.2

(51) Int. Cl.
*H01M 50/538* (2021.01)
*H01M 10/0525* (2010.01)
*H01M 10/0587* (2010.01)

(52) U.S. Cl.
CPC ..... *H01M 50/538* (2021.01); *H01M 10/0525* (2013.01); *H01M 10/0587* (2013.01)

(58) Field of Classification Search
CPC .................. H01M 10/0587; H01M 50/538
See application file for complete search history.

(56) References Cited

U.S. PATENT DOCUMENTS 11,380,965 B2 *   7/2022   Ham .................. H01M 10/0585
2010/0190056 A1 * 7/2010   Turner ................ H01M 50/534
                                               429/211

FOREIGN PATENT DOCUMENTS

| CN | 202721219 U | 2/2013 |
| CN | 203119048 U | 8/2013 |
| CN | 205028971 U | 2/2016 |
| CN | 106129319 A | 11/2016 |
| CN | 106257710 A | 12/2016 |
| CN | 108963175 A | 12/2018 |

(Continued)

OTHER PUBLICATIONS

Machine translation of written opinion of CN2020/130545 (no date) (Year: 0000).*

(Continued)

*Primary Examiner* — Amanda C. Walke

(57) ABSTRACT

The present application discloses a multi-tab cylindrical battery roll core, including an electrode sheet and a separating film stacked and wound with each other; a tabs and a lead are arranged at the electrode sheet, the tabs is integrally connected with the electrode sheet, and the lead is fixedly connected to the electrode sheet; the tabs and the lead of the same electrode sheet are stacked with each other and are located at a side of a central hole of the roll core; on the same electrode sheet, the lead is located at a side of the tabs stacked with one another, or on the same electrode sheet, the tabs stacked with one another are located between two leads, and the leads can protect the tabs.

6 Claims, 5 Drawing Sheets

(56) References Cited

FOREIGN PATENT DOCUMENTS

| | | | | |
|---|---|---|---|---|
| CN | 211907618 U | | 11/2020 | |
| JP | 2011065981 A | * | 3/2011 | ........ H01M 10/0431 |
| JP | 2013-187077 A | | 9/2013 | |
| KR | 20130071462 A | * | 6/2013 | |
| KR | 20180000223 A | * | 1/2018 | |
| WO | WO-2020084707 A1 | * | 4/2020 | ........ H01M 10/0587 |

OTHER PUBLICATIONS

International Search Report for International Application No. PCT/CN2020/130545, dated Feb. 24, 2021.

* cited by examiner

MULTI-TAB CYLINDRICAL BATTERY ROLL CORE AND LITHIUM ION BATTERY

CROSS REFERENCE TO RELATED APPLICATION

This application is a continuation-in-part of International Application No. PCT/CN2020/130545, filed on Nov. 20, 2020, which claims priority to Chinese Patent Application No. 202020825061.2, filed on May 18, 2020, both of which are hereby incorporated by reference in their entireties.

TECHNICAL FIELD

The present application relates to a technical filed of lithium ion battery production equipment, and specifically relates to a multi-tab cylindrical battery roll core and lithium ion battery.

BACKGROUND

A cylindrical lithium-ion battery has the advantages of the high energy density and the good cycle performance, and is widely used in a mobile phone, a tablet computer, a wearable device, a mobile power supply, a power tool, a power, an energy storage and other fields. With the acceleration of automobile electrification in recent years, a cylindrical battery, as an automobile energy source, has become an alternative energy source for replacing gasoline. However, unlike an electronic product power source, an automobile power source requires higher energy density, higher power output, and higher reliability.

The basic structure of a cylindrical battery roll core includes a positive electrode sheet, a negative electrode sheet and a separating film that are stacked and wound. The positive electrode sheet is provided with a positive electrode tab, and the negative electrode sheet is provided with a negative electrode tab. The positive electrode tab is protrudingly arranged at an end of a roll core, and the negative electrode tab is protrudingly arranged at the other end of the roll core. The traditional cylindrical battery roll core usually only has 1-2 tabs on positive and negative electrodes. For example, the double-tab lithium ion battery roll core winding body described in CN202721219U includes an electrode sheet strip, a first tab and a second tab, on which the first tab and the second tab are welded on the electrode sheet strip. The battery produced by assembling the roll core winding body has the high impedance and the unreasonable heat distribution, and cannot meet the increasing requirements of vehicle-mounted batteries.

In an improved technical solution such as the cylindrical soft-packaged lithium ion battery in CN205028971U, a plurality of aluminum foil tabs are cut on the positive electrode sheet, and a plurality of copper foil tabs are cut on the negative electrode sheet, calculated according to the diameter of the roll core, so that inner layers of the tabs overlap with outer layers of the tabs during the process of winding the electrode sheets. However, in the actual production, due to the thin material of a current collector and the low strength of the overlapping tabs, the phenomenon, for example, the tabs are broken when connected to a housing or a cover plate, occurs during the subsequent assembly process and cannot meet the requirements of the actual working performance of the product.

SUMMARY

The object of the present application is to overcome the defects in the prior art and provide a multi-tab cylindrical battery roll core. A lithium ion battery including the roll core has the low impedance and the high output power of a battery.

In order to achieve the above technical effects, the technical solution of the present application is: a multi-tab cylindrical battery roll core, including an electrode sheet and a separating film stacked and wound with each other, in which tabs are arranged at and integrally connected with the electrode sheet, and a lead is fixedly connected to at least one electrode sheet; the tabs and the lead of the same electrode sheet are stacked with each other and are located at a side of a central hole of the roll core; in which on the same electrode sheet, the lead is located at a side of the tabs stacked with one another, or on the same electrode sheet, the tabs stacked with one another are clamped and arranged between two leads.

In some embodiments, on the same electrode sheet, the lead is located at the side of the tabs stacked with one another, and the lead is arranged between the tabs stacked with one another and the central hole of the roll core.

In some embodiments, the electrode sheet includes a positive electrode sheet and a negative electrode sheet; the positive electrode sheet is provided with a positive electrode tab and a positive electrode lead, and the negative electrode sheet is provided with a negative electrode tab and a negative electrode lead.

In some embodiments, the electrode sheet includes a current collector, a surface of the current collector includes an electrode material coating area and a blank area, and the lead is connected to the blank area of the current collector.

In some embodiments, a thickness of the lead is greater than a thickness of the tab.

In some embodiments, a width of the tab is designed to be a variable width, and the width can be adjusted according to a position of the tab.

The other object of the present application is to provide a lithium ion battery, including the multi-tab cylindrical battery roll core as described above.

The advantages and the beneficial effects of the present application are that:

on the same electrode sheet of the multi-tab cylindrical battery roll core, the lead and the tabs are stacked with each other, and the lead is located at one side of the tabs stacked with one another, or the tabs stacked with one another are located between two leads, and the lead can protect the tabs; when the tabs are connected to a housing or a cover plate by a resistance welding, an ultrasonic welding or the like, the probability of damage to the tabs can be reduced and the process manufacturability of a battery can be improved.

The number of the tabs and connection structures of the tabs are conducive to reducing the impedance of the battery and increasing the output power of the battery.

Figure 1:
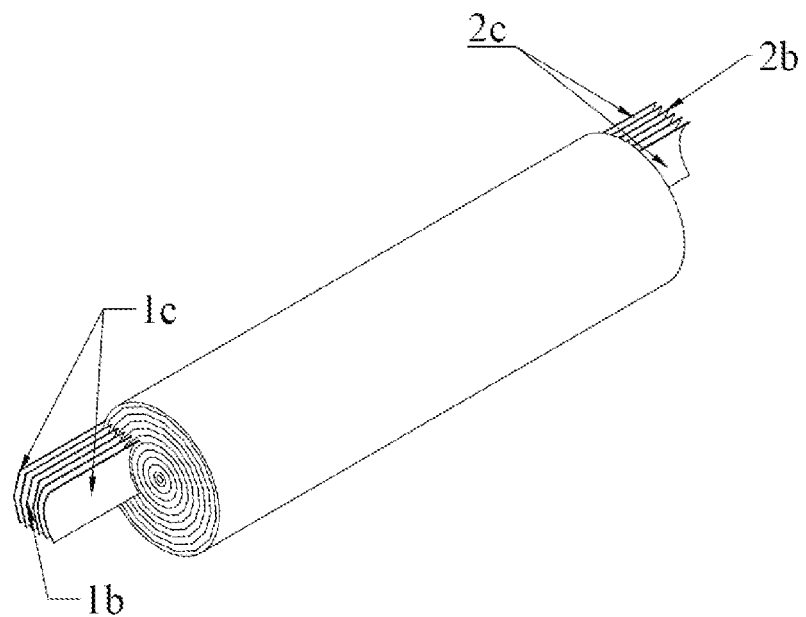
FIG. 1 shows a structural schematic view of a winding structure of a multi-tab cylindrical battery roll core in Example 1.
Figure 2:
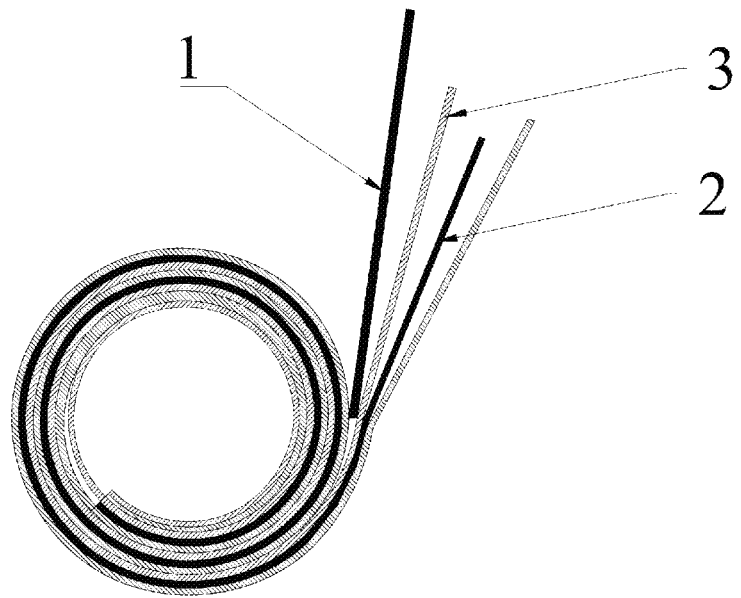
FIG. 2 shows a schematic view of a perspective structure in Example 1.

1—multi-tab positive electrode sheet; 1a—current collector aluminum foil; 1b—positive electrode tab; 1c—positive electrode lead; 1d—positive electrode material coating area; 1e—aluminum foil blank area; 2—multi-tab negative electrode sheet; 2a—current collector copper foil; 2b—negative electrode tab; 2c—negative electrode lead; 2d—negative electrode material coating area; 2e—copper foil blank area; 21—double-tab negative electrode sheet; 3—separating film.

DETAILED DESCRIPTION

The specific embodiments of the present application will be further described below in conjunction with the drawings and the examples. The following examples are only used to illustrate the technical solutions of the present application more clearly, and cannot be used to limit the protection scope of the present application.

A roll core includes a positive electrode sheet, a negative electrode sheet and a separating film. The electrode sheets are provided with tabs and lead, and include the following three parallel solutions:

first, electrode sheet at the same time, and the tabs are arranged at the negative electrode sheet;

second, the tabs and the lead are arranged at the negative electrode sheet at the same time, and the tabs are arranged at the positive electrode sheet;

third, the tabs and the leads are arranged at the positive electrode sheet and the negative electrode sheet at the same time.

The number of the leads determines the positional relationship between the leads and the tabs. The integrally connected tabs are obtained by punching and cutting a current collector foil. The number of tabs is not particularly limited, and usually is several. The more the tabs are set, the more conducive to obtain the effect of reducing impedance.

The number of leads is one, and the lead is located at a side of the tabs stacked with one another; that is, the tabs stacked with one another are arranged between the lead and a central hole of the roll core, or the lead is arranged between the tabs stacked with one another and the central hole of the roll core, rather than the lead is located between the tabs stacked with one another. In some embodiments, the lead is arranged between the tabs stacked with one another and the central hole of the roll core.

The number of leads is two, and the tabs stacked with one another are clamped and arranged between the two leads. In the stacked structure, the leads have a better protective effect on the tabs.

A commonly used current collector of the positive electrode sheet is an aluminum foil, a surface of the aluminum foil is coated with a positive electrode material, an area where the positive electrode material coats is an electrode material coating area, and an area where the positive electrode material does not coat is a blank area. A commonly used current collector of the negative electrode sheet is a copper foil, a surface of the copper foil is coated with a negative electrode material, an area where the negative electrode material coats is the electrode material coating area, and an area where the negative electrode material does not coat is the blank area. The lead is attached to the blank area of the corresponding electrode sheet. Generally, the above-mentioned attachment structure is made by welding, such as the ultrasonic welding.

Example 1

As shown in FIGS. 1-4, in Example 1, a multi-tab cylindrical battery roll core, including a multi-tab positive electrode sheet 1, a multi-tab negative electrode sheet 2, and separating film 3 that are wound and stacked with one another.

Figure 3:
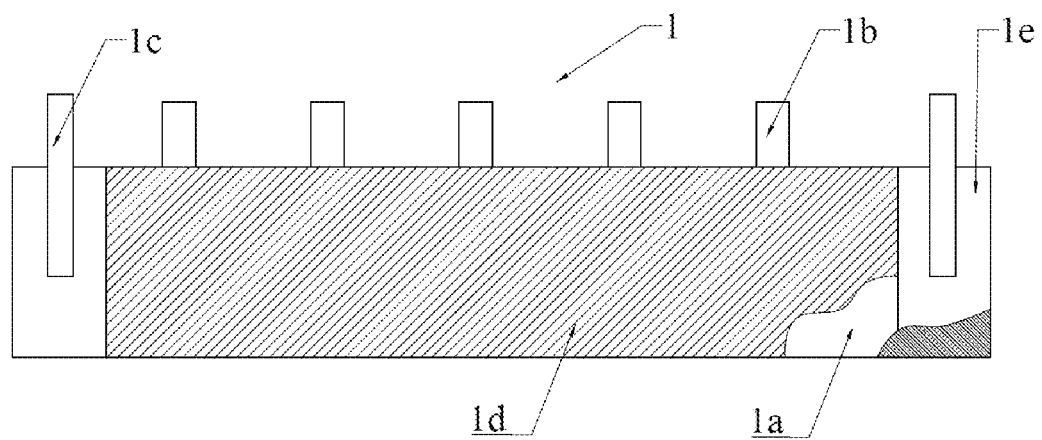
FIG. 3 shows an expanded view of a multi-tab positive electrode sheet in Example 1.

As shown in FIG. 3, the multi-tab positive electrode sheet 1 includes a strip-shaped current collector aluminum foil 1a, a plurality of positive electrode tabs 1b, and a positive electrode lead 1c; two surfaces of the aluminum foil 1a are coated with a positive electrode material, a surface area of the aluminum foil coated with the positive electrode material is a positive electrode material coating area 1d, and a surface area of the aluminum foil that is not coated with the positive electrode material is an aluminum foil blank area 1e.

Figure 4:
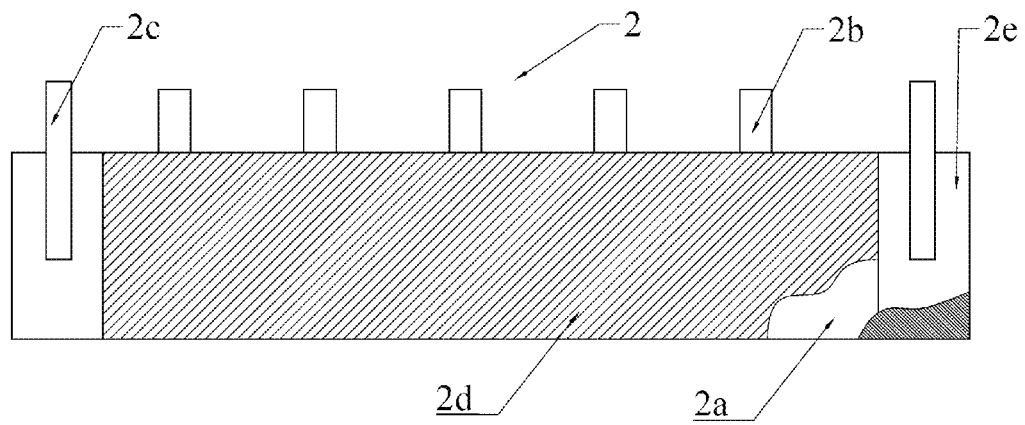
FIG. 4 shows an expanded view of a multi-tab negative electrode sheet in Example 1.

As shown in FIG. 4, the multi-tab negative electrode sheet 2 includes a strip-shaped current collector copper foil 2a, a plurality of negative electrode tabs 2b, and a negative electrode lead 2c; two surfaces of the copper foil 2a is coated with a negative electrode material, a surface area of the copper foil coated with the negative electrode material is a negative electrode material coating area 2d, and a surface area of the copper foil that is not coated with the negative electrode material is a copper foil blank area 2e.

The plurality of positive electrode tabs 1b stacked with one another in the roll core are clamped and arranged between two positive electrode leads 1c, and the plurality of negative electrode tabs 2b stacked with one another are clamped and arranged between the two negative electrode leads 2c, that is, in an expanded view of the electrode sheet, the plurality of tabs on the same electrode sheet are located between the two leads.

A thickness of the lead is greater than a thickness of the tab.

Example 2

Figure 5:
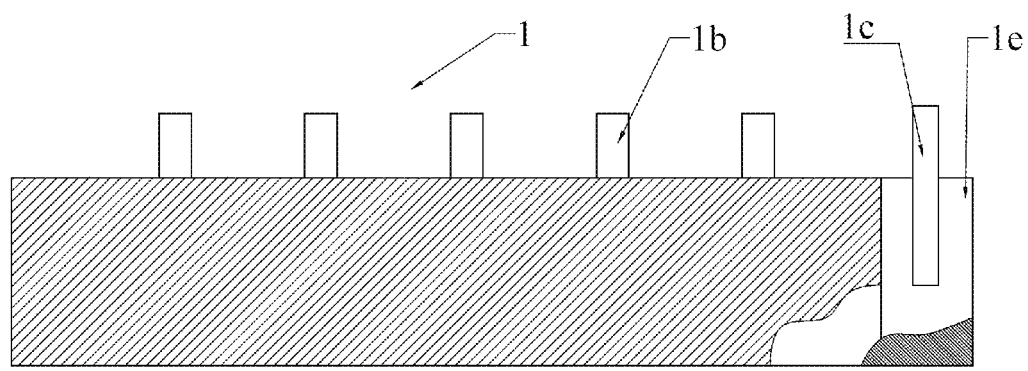
FIG. 5 shows an expanded view of a multi-tab positive electrode sheet in Example 2.
Figure 6:
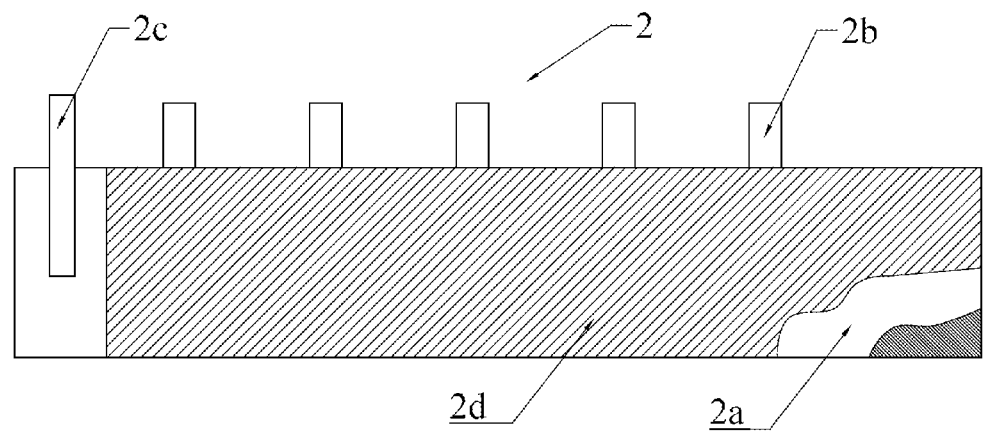
FIG. 6 shows an expanded view of a multi-tab negative electrode sheet in Example 2.

As shown in FIGS. 5-6, Example 2 is based on Example 1. The difference between Example 2 and Example 1 is that the multi-tab cylindrical battery roll core in Example 2 includes the multi-tab positive electrode sheet 1, the separating film 3, the multi-tab negative electrode sheet 3 that are wound and stacked with one another. Herein, the positive electrode lead 1c is arranged on the current collector aluminum foil 1a; the positive electrode lead 1c is located at one end of an inner circle of the current collector aluminum foil 1a, that is, the positive electrode lead 1c is located at an inner side of the plurality of positive electrode tabs 1b (an inner layer and an outer layer of the roll core are referred to the inner and the outer). The negative electrode lead 1c is arranged on the current collector copper foil 2a, and the negative electrode lead 1c is located at one end of an inner circle of the current collector copper foil 1a.

As an alternative solution, the positive electrode lead 1c is located at the inner side of the plurality of positive electrode tabs 1b, and the negative electrode lead 1c is located at an outer side of the plurality of the negative electrode tabs 2b stacked with one another; or the positive electrode lead 1c is located at the outer side of the plurality of positive electrode tabs 1b, and the negative electrode lead 1c is located at the inner side of the plurality of the negative electrode tabs 2b stacked with one another; or the positive electrode lead 1c is located at the outer side of the plurality of positive electrode tabs 1b, and the negative electrode lead 1c is located at the outer side of the plurality of the negative electrode tabs 2b stacked with one another. The protective effect of the lead on the tabs depends on a bending direction of the tabs during production.

Example 3

Figure 7:
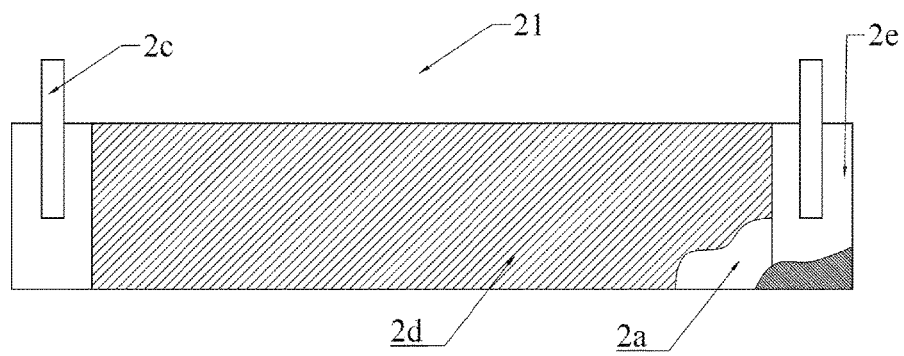
FIG. 7 shows an expanded view of a double-tab negative electrode sheet in Example 3.

As shown in FIG. 7, the multi-tab cylindrical battery roll core in Example 3 includes the multi-tab positive electrode sheet 1 and a double-tab negative electrode sheet 21 that are wound and stacked with each other; the structure of the multi-tabs positive electrode sheet 1 is the same as that of Example 1; the current collector copper foil 2a of the double-tab negative electrode sheet 21 is provided with only two negative electrode leads 2c, and is not provided with the negative electrode sheet which is made by integrally punching and cutting.

As an alternative solution, the current collector copper foil 2a is provided with only several negative electrode tabs 2b, and is not provided with the negative electrode lead 2c; or the current collector aluminum foil 1a is provided with only several positive tabs 1b, and the structure of the multi-tab negative electrode sheet 2 is the same as that of Example 1; or the current collector aluminum foil 1a is provided with only several positive electrode tabs 1b, and the structure of the multi-tab negative electrode sheet 2 is the same as that of Example 1.

The positive electrode sheet and the negative electrode sheet of the multi-tab cylindrical battery roll core are the combination of the positive electrode sheet and the negative electrode sheet in any one of Examples 1-3 and their alternative solutions, which can achieve the basic technical effect for the lead protecting tabs.

Example 4

Figure 8:
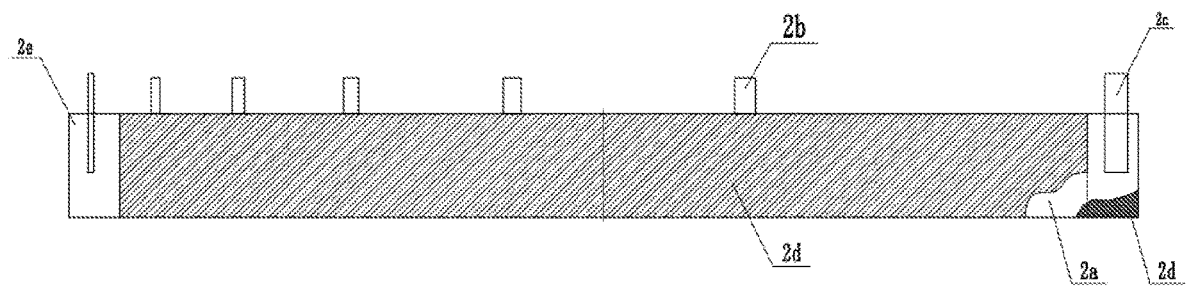
FIG. 8 shows an expanded view of a multi-tab negative electrode sheet in Example 4.

FIG. 8 shows an expanded view of a multi-tab negative electrode sheet in Example 4. Example 4 is based on Example 1. The difference between Example 4 and Example 1 is that a width of the tab is designed to be a variable width, and the width of the tab can be adjusted according to a position of the tab.

Figure 9:
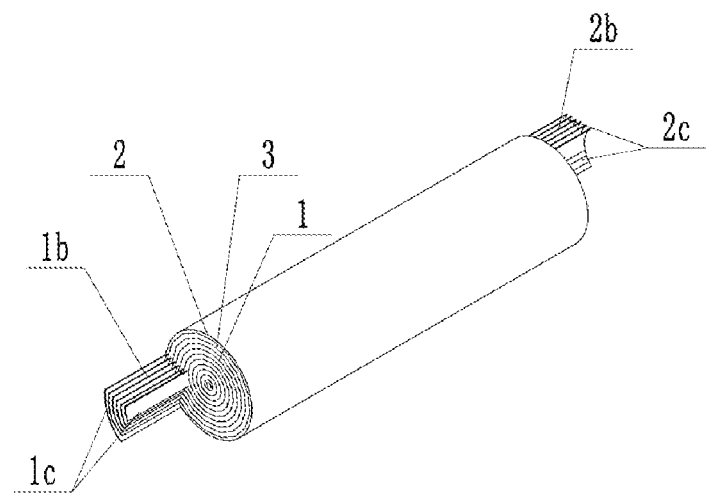
FIG. 9 shows a structural schematic view of a winding structure of a multi-tab cylindrical battery roll core in Example 4.

FIG. 9 shows a structural schematic view of a winding structure of a multi-tab cylindrical battery roll core in Example 4. In general, the farther away the cylindrical battery roll core is from a center, the wider the width of the tab is; the farther away the cylindrical battery roll core is from the center, the larger a circumferential radius of the cylindrical battery roll core is, and the larger the circumference of the cylindrical battery roll core is, that is, the longer a length of a segment of the electrode sheet corresponding to the tab is. The width of the tab corresponds to the length of the corresponding segment of the electrode sheet. The longer the length of segment of the electrode sheet is, the wider the tab is, so that the overcurrent capability of each segment of the electrode sheet corresponding to the tab can be adjusted, and the uniformity of the current density distribution of the entire electrode sheet can be improved. The width of the tab at an outer circumference of the roll core is wider, and the width of the tab at an inner circumference of the roll core is narrow. The tab at the outer circumference can cover the tab at the inner circumference, so that it can compensate for the misalignment of the tabs during winding, facilitate the alignment of the tabs, and facilitate the engineering feasibility of the subsequent work sections.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A multi-tab cylindrical battery roll core, comprising an electrode sheet and a separating film stacked and wound with each other, wherein tabs are arranged at and integrally connected with the electrode sheet, and a lead is fixedly connected to at least one electrode sheet; the tabs and the lead of the same electrode sheet are stacked with each other and are located at a side of a central hole of the roll core; wherein on the same electrode sheet, the lead is located at a side of the tabs stacked with one another, or the tabs stacked with one another on the same electrode sheet are clamped and arranged between two leads; a width of a tab is designed to be a variable width, and the width is adjusted according to a position of the tab.

2. The multi-tab cylindrical battery roll core according to claim 1, wherein on the same electrode sheet, the lead is located at the side of the tabs stacked with one another, and the lead is arranged between the tabs stacked with one another and the central hole of the roll core.

3. The multi-tab cylindrical battery roll core according to claim 1, wherein the electrode sheet comprises a positive electrode sheet and a negative electrode sheet; the positive electrode sheet is provided with a positive electrode tab and a positive electrode lead, and the negative electrode sheet is provided with a negative electrode tab and a negative electrode lead.

4. The multi-tab cylindrical battery roll core according to claim 1, wherein the electrode sheet comprises a current collector, a surface of the current collector comprises an electrode material coating area and a blank area, and the lead is connected to the blank area of the current collector.

5. The multi-tab cylindrical battery roll core according to claim 1, wherein a thickness of the lead is greater than a thickness of the tab.

6. A lithium ion battery, characterized by comprising the multi-tab cylindrical battery roll core according to claim 1.

* * * * *